United States Patent [19]
Coon

[11] 3,948,102
[45] Apr. 6, 1976

[54] TRIELECTRODE CAPACITIVE PRESSURE TRANSDUCER

[75] Inventor: Grant W. Coon, Palo Alto, Calif.

[73] Assignee: The United States of America as represented by the Administrator of the National Aeronautics and Space Administration, Washington, D.C.

[22] Filed: July 17, 1975

[21] Appl. No.: 596,788

Related U.S. Application Data

[62] Division of Ser. No. 493,363, July 31, 1974, abandoned.

[52] U.S. Cl. ............................. 73/398 C; 317/246
[51] Int. Cl.² ......................................... G01L 9/12
[58] Field of Search ............ 73/398 C, 393, 88.5 R, 73/141 A; 317/246; 324/60 R, 61 R

[56] References Cited
UNITED STATES PATENTS 3,577,883   5/1971   Werner ........................... 73/398 C
3,619,742   11/1971  Rud ............................... 73/398 C

*Primary Examiner*—Donald O. Woodiel
*Attorney, Agent, or Firm*—Darrell G. Brekke; Armand G. Morin, Sr.; John R. Manning

[57] ABSTRACT

A capacitive transducer and circuit especially suited for making measurements in a high-temperature environment. The transducer includes two capacitive electrodes and a shield electrode. As the temperature of the transducer rises, the resistance of the insulation between the capacitive electrode decreases and a resistive current attempts to interfere with the capacitive current between the capacitive electrodes. The shield electrode and the circuit coupled thereto reduces the resistive current in the transducer. A bridge-type circuit coupled to the transducer ignores the resistive current and measures only the capacitive current flowing between the capacitive electrodes.

8 Claims, 5 Drawing Figures

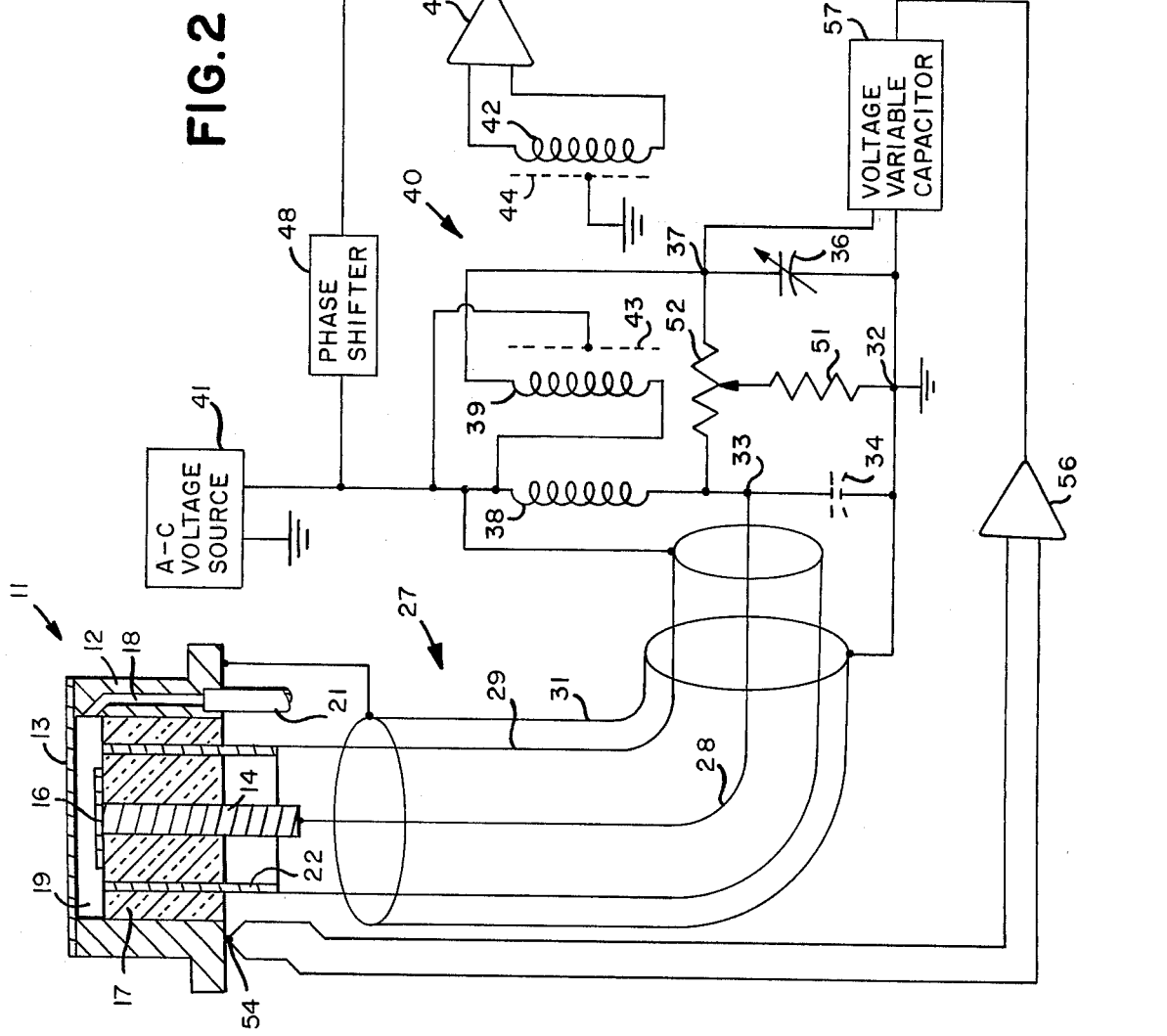

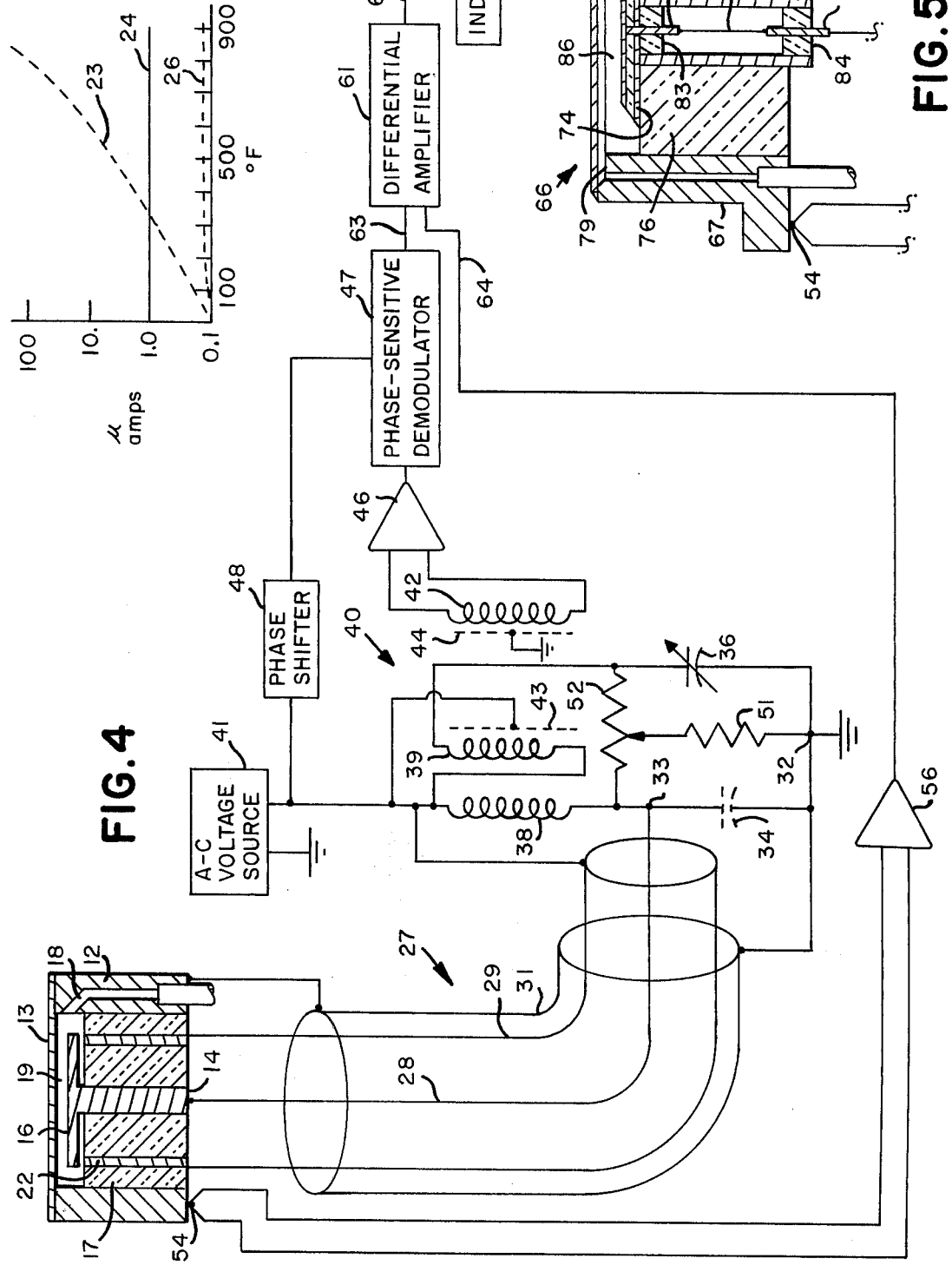

TRIELECTRODE CAPACITIVE PRESSURE TRANSDUCER

The invention described herein was made by an employee of the United States Government and may be manufactured and used by or for the Government and for Governmental purposes without the payment of any royalties thereon or therefore.

This is a division, of application Ser. No. 493,363 filed July 31, 1974, now abandoned.

BACKGROUND OF THE INVENTION

This invention relates to capacitive pressure transducers and, more particularly, to such a transducer which is capable of providing accurate measurements within high temperature environments, and a measuring circuit therefore which eliminates the effect of temperature and resistance changes on the measured output of such transducer.

Because of their ruggedness, small size and accuracy, diaphragm-type capacitance transducers, such as the one disclosed and claimed in my U.S. Pat. No. 3,027,769, are commonly used in many different environments. However, their use in high temperature and/or humid environments has been limited. More particularly, the resistance of certain of the electrical parts differs substantially in such environments from that in more typical environments, with the result that the transducer output represents such changes, as well as the desired capacitive changes due to pressure. For example, with respect to the transducer described in U.S. Pat. No. 3,027,769, when the insulating block which separates the transducer housing and diaphragm from the film electrode is glass, its resistance changes by as much as 4 or 5 orders of magnitude when its temperature is varied from 70°F to 800°F. This resistance is directly in shunt with the cell capacitance to be measured and may reach a value as low as 10,000 ohms at 800°F in a transducer having a total capacitive reactance of 160,000 ohms at 100 KHz. It will be recognized that such a relatively low resistance in shunt with the capacitor electrodes will significantly affect the output of the transducer, especially when the capacitance changes to be measured are relatively minute, e.g., less than $1 \times 10^{-13}$ farad. Moisture collected on the exposed surfaces of the insulator can also substantially reduce the resistance between the electrodes provided by the insulating block. Such interference in the accuracy of a pressure measurement taken with such a transducer has inhibited their uses for many purposes for which they are otherwise ideally suited because of their ruggedness and small size.

SUMMARY OF THE INVENTION

The present invention is a capacitor transducer and a capacitance measuring circuit therefor which eliminates the adverse effects of temperature and humidity changes on the capacitance readings, without compromising the other features of such a transducer which makes it especially useful for many purposes. In its basic aspects, a transducer in accordance with the invention includes, as is usual, first and second capacitor electrodes having capacitance areas lying in spaced-apart, facing relation with a dielectric material, such as air, therebetween. An electrical insulator mechanically secures the first and second electrodes together to maintain the capacitance areas thereof in the required relationship to one another for accuracy within the desired capacitive range, and a source of varying potential is connected to one of the electrodes while the other one is maintained at a different reference potention, e.g., ground.

In accordance with the instant invention, a third electrode is also included as a part of the capacitive transducer. Such third electrode is interposed between the pair of capacitor electrodes. Means are also included for applying a potential to such third electrode having generally the same amplitude and phase as the potential applied to the one capacitor electrode. When the transducer temperature is low and the insulation resistance is high, a field of zero potential gradient exists between the third electrode and the capacitor electrode. This prevents an unwanted resistive current from flowing between the third electrode and the capacitor electrode and through the dielectric between the capacitor electrodes. When the transducer temperature is very high and the insulation resistance is low, the potentials on the third electrode and the particular capacitor electrode may slightly vary from each other, for example, the potentials may vary by a millivolt. Although the voltage differential causes an unwanted resistive current to flow through the insulation and the dielectric, a special measuring circuit is provided that is sensitive only to the capacitive current component flowing through the transducer capacitor. The resistive current component is ignored and the measurement is representative of the actual capacitance of the transducer.

In its basic aspects, the capacitance measuring circuit is a current nulling circuit which is, in effect, a bridge. It includes a transformer having a pair of bifilar-wound primary wingings connected in opposition. The first winding of which is connected serially with the capacitance to be measured and the second is connected serially with a reference capacitance. The means provided for applying a varying potential to the one capacitor electrode does so through the first primary winding, and also applies such varying potential through the second primary winding to the reference capacitance. The result is that a change in the capacitance to be measured causes a corresponding change in the relative current flow through a pair of opposed windings and, hence, a change in the output potential of the transformer secondary winding. This change in the secondary winding output potential is proportional to the change in the relative current flow through the primary windings, and, hence, proportional to the change to be measured in the capacitance.

Most desirably, the potential which is applied to the third electrode is provided by electrically connecting such electrode into the measuring circuit on the side of the first primary winding opposite that to which the capacitance to be measured is connected, and the first primary winding is provided with a low inductive reactance compared to the capacitive reactance of the capacitance to be insured for a correspondingly small potential drop thereacross. This connection will result in the potential applied to the third electrode having the desired amplitude and phase, i.e., generally the same amplitude and phase as that applied to the aforementioned capacitor electrode.

The resistive current component, if any, through the transducer capacitor is in quadrature with the capacitive current component. Inasmuch as it is desired to only measure the capacitive current component, a means is provided that is only sensitive to the capacitive current component. The means is coupled to the secondary winding of the transformer.

Operation of a capacitive transducer in a high temperature operation can cause a "zero shift" in the transducer, i.e., a change in the transducer capacitance due to heat distortion of the transducer components, rather than due to pressure changes. The invention further includes means for compensating for such zero shift. More particularly, means, such as a thermo-couple, are provided for sensing changes in the temperature of the capacitor electrodes, and means are also included responsive to the sensing of a temperature change by eliminating the effect of such temperature change on the output of the measuring circuit.

The invention includes other features and advantages which will be described or will become apparent from the following more detailed description of preferred embodiments.

BRIEF DESCRIPTION OF THE DRAWINGS

With reference to the accompanying two sheets of drawings:

FIG. 1 is an enlarged, cross-sectional view of a preferred embodiment of a capacitive force sensing transducer of the invention;

FIG. 2 is a schematic electrical diagram of a capacitance change measuring circuit of the invention including the embodiment of the capacitive transducer shown in FIG. 1;

FIG. 3 is a graph comparing the resitive current produced in a capacitive transducer of the invention with that in a conventional capacitive transducer;

FIG. 4 illustrates another preferred embodiment of a capacitance measuring circuit of the invention incorporating a second transducer embodiment; and FIG. 5 is an enlarged cross-sectional view of still another preferred embodiment of the capacitive transducer of the invention.

DETAILED DESCRIPTION OF THE PREFERRED EMBODIMENTS

With reference first to FIG. 1, a force sensing capacitance transducer of the invention is generally referred to by the reference numeral 11. Transducer 11 is of the rugged yet highly sensitive construction described and claimed in U.S. Pat. No. 3,027,769. In more detail, the transducer 11 is a capacitive pressure transducer which includes, as part of a first capacitor electrode, an outer electrically conductive supporting housing 12. Such housing is preferably cylindrical for ease of fabrication and has a diaphragm 13 peripherally mounted on its upper rim. If the transducer is to be used in environments in which temperatures are expected to change, desirably the material for the diaphragm 13 is one having a temperature expansion coefficient which is slightly less than that of the housing 12. Variations in temperature will thus cause corresponding variations in the tightness of the diaphragm to compensate for changes with temperature of the modulus of elasticity of the diaphragm. Thus, shifts in the sensitivity of the transducer due to temperature changes are essentially obviated.

In transducer 11, the desired capacitance measurement is made between first electrode 13 and a second electrode 20. Second electrode 20 comprises an electrically conductive lead rod 14 which extends coaxially into the housing and terminates in an electrically conductive plate 16 which lies in spacedapart, facing and parallel relation to one side of the diaphragm 13. An electrical insulator mechanically secures such second electrode in such position relative to the first electrode. That is, a cylindrical block 17 of an insulating material is located interiorly of housing 12 mechanically supporting the rod 14 and the plate 16 relative to housing 12. In this connection, the block 17 is desirably of a glass or a ceramic which is hermetically sealed and secured to the rod 14 and the interior surface of the housing 12 by firing or the like. Plate 16 may be, for example, a thin metallic film on the upper flat surface of the insulating block and the top of rod 14. Such film may be produced, for example, by painting the upper flat surface of the insulating block and the end of rod 14 with gold chloride and then firing the assembly. Alternatively, the second electrode may comprise a metallic plate 16 welded to a metallic rod 14, or the plate 16 and rod 14 may be machined from a single piece of metal.

The dielectric between the plate 16 and the diaphragm 13 is a gas 19 such as air. The distance of their spacing is chosen in light of the desired capacitance between such members. For example, a spacing of 0.002 inch when there is no pressure differential on the opposite side of the diaphragm 13 has been employed in working models of the invention. Diaphragm 13 is made flexible so as to deflect in response to a difference in pressure on its opposite sides. It will be recognized that the consequent changing of the distance between such diaphragm and the plate 16 will provide a change in the capacitance defined by such diaphragm and plate. This change in capacitance, for small deflections compared with the original spacing, is proportional to the change in distance between the diaphragm 13 and plate 16 and consequently with the change in pressure differential on such diaphragm. It is this change in capacitance which can thus provide the desired measurement of the pressure differential to which the diaphragm is subjected. In this connection, means are provided for maintaining a constant reference pressure on the underneath side of the diaphragm. That is, a bore 18 extends through the cylindrical wall of the housing 12 and a portion of the block 17 to communicate with the space between the diaphragm 13 and plate 16. A tube 21 connected to a suitable source of an air reference pressure (not shown) is received within an enlarged end portion of bore 18 to provide communication of such source with the cavity between the diaphragm 13 and plate 16. It will be appreciated that deflection of the diaphragm 13 will therefore be due to a difference in pressure between that supplied by the reference pressure and that on the outer side of the diaphragm 13. With knowledge of the pressure provided by the reference source, the change in capacitance due to deflection of the diaphragm 13 because of a pressure differential enables the pressure to which the outer side of the diaphragm is subjected to be easily calculated. If desired, bore 18 can be permanently sealed off once a desired reference gas pressure is obtained inside the transducer.

To the extent described so far, the capacitance pressure transducer 11 is generally conventional. As discussed previously, although such transducers are of a rugged construction and are highly sensitive, they are incapable of providing accuracy at high temperatures. That is, the resistance of the insulation material making up block 17 changes substantially at higher temperatures. As mentioned before, if the block 17 is glass as is most desirable to provide the transducer with the matched expansion characteristic necessary for accuracy, the resistance of the block 17 is four or five orders of magnitude less at 800°F than it is at 70°F. Because this resistance is directly in shunt with the capacitance between the plate 16 and the diaphragm 13, it, at the least, introduces a substantial error in the desired pressure measurement, and in some situations can completely mask it.

As a particularly salient feature of the instant invention, it includes means for substantially reducing resistive current flow through a region of the insulating block and the dielectric between plate 16 and diaphragm 13. More particularly, the transducer includes a third electrode 22 that is imbedded in block 17 and interposed between the housing 12 and rod 14. Electrode 22 is generally of cylindrical configuration and is made of an electrically conductive material. Care must be taken to see that no portion of insulating block 17 extends over the upper end of electrode 22. This block material would provide a jumper for current flow between the insulating block portion inside electrode 22 and the insulating block portion on the exterior of electrode 22.

In some applications, it is not unusual for a-c source 41 to supply a signal as large as 40 volts. At high temperatures, the resistance of insulating block 17 is relatively low. At high temperatures, but for electrode 22, which serves as an electrical shield, the resistive current flowing between housing 12 and rod 14 would be much larger than the desired capacitive current between plate 16 and diaphragm 13 and the desired signal would be swamped by "noise." The large resistive current is avoided by maintaining the potential on electrode 22 as close as possible to the potential of the second electrode. Whatever resistive current passes between housing 12 and electrode 22 will not be seen as a current flowing between plate 16 and diaphragm 13.

The graph of FIG. 3 provides a quantitative comparison of the effect of temperature change on the resistive current in a transducer constructed in accordance with the instant invention, with that in a transducer which is the same as that described except for the third electrode and the means for applying a potential to it. FIG. 3 presents this comparison by showing resistive current in the insulating block plotted on a logarithmic scale vs. the temperature of such insulator block on a linear scale. The resistive current in the conventional transducer is represented in the graph by line 23. It will be seen that as the temperature increases, the amount of such current correspondingly increases at a logarithmic increasing rate. It will further be noticed that when the temperature of the insulator reaches approximately 350°F such current exceeds the full scale capacitive current represented by the line 24. In contrast, the resistive current through the insulating block of a trielectrode transducer conforming with the invention remains at a low, generally constant value as represented by line 26, substantially below the capacitive current.

Another advantage of the described trielectrode transducer arrangement of the invention is that it lends itself readily to the use of a triaxial cable to connect the transducer to capacitance measuring circuitry. The central lead rod 14 of the transducer, the most capacitive-sensitive conductor of the transducer, is connected to the inner conductor of the cable as represented at 28 in FIG. 2. The intermediate cable conductor represented at 29 is connected to the third electrode 22 of the transducer, and the outer conductor 31 of such cable is connected to the housing 12.

As will be more apparent hereinafter, the use of the triaxial cable in combination with the bridge circuit enables the capacitive and resistive contributions inherent in leads to the transducer to be separated from the measurement of capacitance changes in the transducer. Further, this triaxial cable and transducer arrangement allows the first electrode and, hence, the transducer housing, to be grounded, with the result that the possibility of shorting the circuit is minimized and insulation need not be included between the transducer and its mounting structure.

As another salient feature of the instant invention, it includes a capacitance measuring circuit especially adapted for use with the trielectrode transducer. Such circuit is a current nulling circuit which acts, in effect, as an alternating-current bridge having in one leg thereof the capacitor formed by the first and second capacitor electrodes of the transducer. More particularly, the outer electrode of the transducer is connected via the outer cable conductor 31 to ground as represented at 32, and the second capacitor electrode is connected into the circuitry on the side opposite ground at node 33 via inner or central cable conductor 28. The capacitance thus provided by the transducer between ground 32 and node 33 is schematically represented in the drawing by the dotted line capacitor 34. A reference capacitor 36 is also connected between ground and a node 37 in the circuitry.

Transformer 40 has two bifilar-wound primary windings 38 and 39 and secondary winding 42. Each of the primary windings act as a leg of the a-c bridge. Windings 38 and 39 are connected so as to oppose each other. An a-c voltage source 41 is connected between ground and the junction between the two primary windings.

It will be recognized that as so far described, when the capacitances represented by the capacitances 34 and 36 are equal, the potential applied to the opposing windings or coils 38 and 39 will be correspondingly the same. The result will be that the magnetic flux generated in the core on which such windings are wound will be zero, and no voltage will be generated in the transformer secondary winding represented at 42. However, if the capacitances 34 and 36 are made to differ, the currents through the coils 38 and 39 magnetizing the core will be unequal, with the result that flux will be generated in the core proportional to such capacitance unbalance. Such flux will generate a voltage in the secondary winding 42, which voltage will likewise be proportional to the capacitance differential.

In order to prevent the transfer of energy from the primary to the secondary coils through interwinding capacitances rather than the desired measured capacitance, both the primary and secondary coils should be individually electrostatically shielded. Such shields are represented in the drawing by shields 43 and 44.

As illustrated, the third electrode 22 is electrically connected to the measuring circuit on the side of primary winding coil 38 opposite to that side which is connected to the cable central conductor 28. This results in the voltage of source 41 being applied directly to the third electrode. The impedance of primary winding 38 is preferably low compared to the impedance of the transducer in order to minimize the voltage drop thereacross. When the bridge circuit is in a balanced condition, i.e., when the capacitances of the transducer and capacitor 36 are equal, the currents in the two primary windings are equal and opposite so that no magnetic flux is produced. With no flux, no inductive voltage is developed across winding 38. Assuming the resistive voltage drop across winding 38 to be negligible, the voltage on the second electrode 20 and the third electrode 22 will be essentially the same.

During the balanced condition, when the potentials applied to the second and third electrodes are essentially identical, a zero or near zero potential gradient exists between the electrodes and little or no current can thus flow through the insulator 17 between rod 14 and electrode 22. Accordingly, current flow between the first and second electrodes is essentially restricted to the desired region. The unshielded zone between diaphragm 13 and plate 16.

When diaphragm 13 of the transducer is deflected, the capacitance of capacitor 36 differs from the capacitance of the transducer and an imbalance occurs in the bridge. The unequal winding currents create a magnetic flux and an inductive potential across winding 38. When this happens, the voltage on the second electrode slightly differs from the voltage on the third electrode. But for the third electrode, the voltage difference across the insulation would be relatively large. The voltage gradient between the electrodes produces a current flow from the third electrode through the insulator to rod 14 and thence through plate 16 and dielectric 19 to ground (diaphragm 13 and housing 12 are at ground potential). The current passing through the insulator and the gap between plate 16 and diaphragm 13 causes a voltage drop in the transducer which is related to the insulator resistance, not the capacitance to be measured by the transducer. At high temperatures, of course, the insulator resistance is low and the current therethrough is significant. This "resistively-raised" potential of the transducer capacitor indirectly affects the measuring current through the transformer primary circuit. The special circuit of FIG. 1 enables the selective measurement of the desired transducer parameter.

Analysis of the bridge circuit shows that the current $I_1$ through the transformer primary winding 38 and the dielectric between plate 16 and diaphragm 13 is defined by $$I_1 = \frac{E_{AC}}{j\omega 1 - j\frac{1}{\omega C} + \frac{L}{CR_s}}$$

where $E_{AC}$ is the a-c voltage from source 41, L is the inductance of winding 38, C is the capacitance of the "plate 16/diaphragm 13" capacitor, and $R_s$ is the resistance seen looking into the inner and next-to-inner conductors of the cable from the terminals of winding 38 (the cable resistance and the resistance of the insulation between the second and third electrodes). The equation indicates that the only component with $R_s$ in it does not have a j associated with it as does the desired capacitive factor $$\left(-j\frac{1}{\omega C}\right).$$

Accordingly, the $L/CR_s$ factor produces an effect in the transformer secondary which is in quadrature with the capacitive factor $$\left(-j\frac{1}{\omega C}\right).$$

The secondary 42 of the transformer is fed through an amplifier 46 to a phase-sensitive demodulator 47. A phase shifter 48 is coupled between the a-c voltage source 41 and the phase-sensitive demodulator. The amount of phase shift provided by phase shifter 48 is selected so that the demodulator locks on to and rectifies the peaks of the capacitive component of the input signal and ignores the resistive component which is in quadrature to the capacitive component. The output of the demodulator is a d-c voltage having an amplitude proportional to the amplitude of the capacitive component of the voltage generated by secondary winding 42. That amplitude is a direct function of the capacitance of the "diaphragm 13/plate 16" capacitor and it varies as diaphragm 13 is deflected by input pressures. The d-c voltage is fed from the output of the demodulator to indicator 49. The indicator may be, for example, a d-c voltmeter calibrated in terms of capacitance or pressure.

Means are also provided for initially adjusting the measuring circuit as necessary to eliminate any output when the diaphragm 13 is not deflected. The capacitance of reference capacitor 36 is adjustable to provide capacitive balance. For resistive balance, a resistance 51 is connected between ground and a variable resistance 52 in shunt with the two primary windings 38 and 39.

As mentioned previously, operation of the transducer in a range of different environmental temperatures can result in a zero shift due to heat distortion of the cell. Such a zero shift is generally linear with temperature and quite repeatable. The invention includes means for compensating for such a zero shift. More particularly, a thermocouple as schematically represented at 54 is connected to the housing 12 in thermally conducting relationship to sense temperature changes in the transducer. As illustrated, the output of such thermocouple is connected through a d-c amplifier 56 to a voltage variable capacitor 57 connected in parallel across capacitance 36 of the bridge circuit. In general, the capacitance of the transducer will decrease with increasing temperature. Thus, the output of the thermocouple is connected to the voltage variable capacitor 57 to decrease the combined capacitance provided by it and the capacitor 36 upon such a temperature increase, by an amount which nullifies or minimizes the zero shift. Changes in the capacitance of the measuring circuit due to temperature changes at the capacitor electrodes can thereby be compensated.

The output of thermocouple 54 is also usable to compensate for shift with changes in temperature of the sensitivity of the transducer. That is, its output can be connected to the amplifier 46, for example, to control its gain. However, by the proper selection of the diaphragm and rim materials as discussed previously, compensation for the sensitivity shift can be had without the added electronic complexity.

Compensation for the zero shift in the transducer can also be made at the output of the circuitry, rather than directly within the bridge as discussed above. In this connection, reference is made to FIG. 4 which illustrates an embodiment of the transducer and capacitance measuring circuit which differs from that of FIG. 2 in the electrode arrangement of the transducer and the manner in which possible zero shift is nullified. Those components of the FIG. 4 embodiment which are the same as those in the FIG. 2 embodiment are referred to by like reference numerals.

The size of the capacitance-type pressure transducer is often important. For example, when pressure measurements must be made on a small-scale wind tunnel model, a small transducer must be employed.

In the transducer of FIG. 4, plate 16 is supported above insulator block by rod 14. As in the FIG. 1 transducer, plate 16 and rod 14 may either be made from one piece of electrically conductive material or the plate and the rod may be made separately and then fastened together so that there is an electrical connection therebetween. Inasmuch as plate 16 is elevated over insulator 17, shield electrode 22 may be moved in nearer to rod 14 (as shown) and under the extremities of plate 16. Once shield electrode 22 is made smaller, diaphragm 13 and the housing 12 may be made smaller. Thus, for the same size plates 16, the transducer of FIG. 4 will be smaller than the transducer of FIG. 1.

The outputs of phase-sensitive demodulator 47 and d-c amplifier 56 are coupled to the inputs of a differential amplifier 61 via leads 63 and 64, respectively. The output of the differential amplifier is connected to an indicator 62 by means of connection 65. Indicator 62 may be, for example, a d-c voltmeter calibrated in terms of pressure. The amplitude of the output signal from amplifier 56 represents the zero shift caused by the ambient temperature to which the transducer is subjected. In differential amplifier 61, the "zero shift" signal is substracted from a signal (output of phase-sensitive demodulator 47) which represents the measured pressure plus zero shift. Thus, indicator 62 receives a d-c signal which is untainted by any zero shift.

FIG. 5 illustrates another embodiment of a three-electrode capacitive pressure transducer of the invention. Such embodiment is in many respects the same as the embodiment shown in FIGS. 1 and 2.

The transducer of FIG. 5 is generally referred to by the reference numeral 66. As with the previous embodiments, it comprises first and second capacitor electrodes and a third shield or auxiliary electrode. The first electrode is a pressure-responsive diaphragm 68 which is secured to an end of housing 67. The second electrode 69 and the third electrode 74 are secured to and electrically insulated from each other by insulative layer 71. The third electrode 74 is secured to an insulating block 76 which extends from inner wall to inner wall of housing 76. A conduit 77 is fastened in a centrally located aperture of the insulating block 76. The two ends of conduit 77 are sealed by insulators 83 and 84, respectively. Terminal rods 72 and 85 are supported in insulators 83 and 85, respectively, and the rods are joined by electrical lead 73. A gas 86 forms the dielectric between capacitor electrodes 68 and 69 and the gas is admitted to that electrode region via passageway 82. If desired, the passageway may be sealed off once a selected reference gas pressure is obtained within the interior of the transducer. Housing 67, like the three electrodes, conduit 77, rods 72 and 85, and lead 73, is made from electrically conductive material. The second and third electrodes may be, for example, thin, fired metallic films. Terminal rod 72 is electrically connected to second electrode 69. Layer 71, insulating block 76, and insulators 83 and 84 are preferably glass or ceramic. It is important that the outside peripheral edge of the third electrode plate 74 be free of ceramic or other insulative material which might provide a path for resistive current from layer 71 to block 76.

The transducer of FIG. 5 also differs from those of the earlier described embodiments in the specific manner in which a reference pressure is applied to the space between first electrode 68 and second electrode 69. More particularly, the rim of the housing to which the diaphragm 68 is secured is relieved to provide a shelf 79 so that the gas passageway is not impeded by diaphragm 68. This particular construction is a somewhat simpler means of providing the communication for a reference pressure through the bottom of the transducer than that previously described.

Transducer 66 may be substituted for either the transducer in FIG. 1 or the transducer in FIG. 4. In making the substitution, the thermocouple 54 is connected to housing 67, the inner conductor of the triaxial cable is connected to rod 85, the second cable conductor is connected to the housing 67. Third electrode 69 is driven at the same or near the same voltage (depending on the degree of bridge balance and the ambient temperature) as electrode 74. The driven third electrode thus provides a very effective means for reducing the resistive current flow through layer 71 and the dielectric between the first and second electrodes. As in the other embodiments, the phase-sensitive demodulator discriminates between the resistive component and capacitive component of the transformer secondary output and only measures the capacitive component. The amplitude of the capacitive component is a direct function of the capacitance between the first and second electrodes as well as the input pressure on the diaphragm.

Whereas many alterations and modifications of the present invention will no doubt become apparent to the person of ordinary skill in the art after having read the foregoing description, it is to be understood that the particular embodiments are shown and described by way of illustration only and are in no way intended to be considered limiting. For example, although it is easier to fabricate a cylindrical transducer, the invention will perform satisfactorily if other geometrical shapes are employed. Specifically, the diaphragm may be circular, square, rectangular, elliptical, etc. It is intended that the invention be limited only as indicated by the scope of the following claims.

What is claimed is:

1. Apparatus for a capacitive transducer having first and second spaced-apart facing electrodes with a dielectric therebetween and a third electrode which partially shields said first electrode from said second electrode comprising:

a transformer having first and second primary windings and a secondary winding;
a reference capacitor;
means for coupling said secondary primary winding of said transformer between said first primary winding and said reference capacitor, said first primary winding, said second primary winding and said reference capacitor each forming one leg of a bridge;
means for inputing an a-c signal to said bridge;
means for connecting said ends of said first primary winding to said second and third electrodes, respectively;

means for connecting said first electrode to the end of said capacitor remote from said second primary winding; and means coupled to said inputing means and said secondary winding for measuring only the capacitive component of a-c current flowing between said first and second electrodes.

2. Apparatus as claimed in claim 1 including means for sensing the temperature of said electrodes; and means coupled to said sensing means for compensating said measuring means for the effects of said sensed temperature.

3. Apparatus comprising:

first and second capacitor electrodes each having a sensing portion, said sensing portions being in spaced-apart facing relation with a dielectric material therebetween;

an electrical insulator adjoining portions of both of said capacitor electrodes;

a third electrode dividing said insulator into two parts;

a transformer having first and second primary windings and a secondary winding;

a reference capacitor;

means for coupling said second primary winding in series between said first primary winding and said reference capacitor;

an a-c voltage source connected across said second primary winding and said reference capacitor;

means for connecting the ends of said first primary winding to said second and third capacitor electrodes, respectively;

means for connecting said second primary winding and said reference capacitor between said first and second capacitor electrodes, respectively; and means coupled to said secondary winding for measuring only the capacitive current component flowing between said sensing portions.

4. The apparatus of claim 3 wherein said two means for connecting comprise a triaxial cable, said inner conductor of said cable being connected to said second capacitor electrode, said middle cable conductor being connected to said third electrode, and said outer cable conductor being connected to said first capacitor electrode.

5. Apparatus as set forth in claim 3 further comprising:

means for sensing the temperature of said capacitor electrodes; and means coupled to said sensing means for compensating said measuring means for the effects of said sensed temperature.

6. Apparatus as set forth in claim 3 further comprising:

means for sensing the temperature of said capacitor electrodes; and means coupled to said sensing means for imposing a capacitance in shunt with said reference capacitor which capacitance is a function of said sensed temperature.

7. Apparatus as set forth in claim 3 wherein said measuring means comprises:

an indicator;

a phase-sensitive demodulator coupled between the output of said transformer secondary and said indicator; and means for supplying an a-c voltage to said phase-sensitive demodulator that has the same frequency as the voltage from said a-c voltage source and a phase relation that enables said demodulator to detect the capacitive current component through said sensing portions.

8. Apparatus comprising:

first and second capacitor electrodes each having a sensing portion, said sensing portions being in spaced-apart facing relation with a dielectric material therebetween;

an electrical insulator adjoining portions of both of said capacitor electrodes;

a third electrode dividing said insulator into two parts;

a transformer having first and second primary windings and a secondary winding;

a reference capacitor;

means for coupling said second primary winding in series between said first primary winding and said reference capacitor;

an a-c voltage source connected across said second primary winding and said reference capacitor;

means for connecting the ends of said first primary winding to said second and third capacitor electrodes, respectively;

means for connecting said second primary winding and said reference capacitor between said first and second capacitor electrodes, respectively;

a differential amplifier having first and second inputs and an output;

a phase-sensitive demodulator having first and second inputs and an output;

a phase shifter;

an indicator;

said first input of said demodulator being coupled to said transformer secondary, said phase shifter being coupled between said a-c voltage source and said second demodulator input, said demodulator output being coupled to said first input of said differential amplifier, said differential amplifier output being coupled to said indicator;

means for generating a signal representative of the temperature of said capacitor electrodes; and means for coupling said signal to said second input of said differential amplifier.

* * * * *